United States Patent [19]

Miyauchi et al.

[11] Patent Number: 4,656,780
[45] Date of Patent: Apr. 14, 1987

[54] APPARATUS FOR RECIPROCABLY MOVING A DESIRED OBJECT SUCH AS A VEHICLE WINDOW PANEL

[75] Inventors: Shizuya Miyauchi; Takashi Suzuki; Shinichi Minobe; Shigeyuki Soga, all of Shizuoka, Japan

[73] Assignee: Koito Seisakusho Co., Ltd., Tokyo, Japan

[21] Appl. No.: 832,241

[22] Filed: Feb. 24, 1986

[30] Foreign Application Priority Data

Jul. 29, 1985 [JP] Japan .................................. 60-167040

[51] Int. Cl.$^4$ ............................................. E05F 11/38
[52] U.S. Cl. ........................................ 49/348; 49/352; 49/374
[58] Field of Search ................ 49/348, 349, 374, 375, 49/352

[56] References Cited

U.S. PATENT DOCUMENTS

| | | | |
|---|---|---|---|
| 3,469,128 | 9/1969 | Cartier | 49/349 X |
| 3,834,080 | 9/1974 | Lystad | 49/348 |
| 4,004,371 | 1/1977 | Podolan et al. | |
| 4,235,117 | 11/1980 | Pickles | 49/349 X |
| 4,237,657 | 12/1980 | Kazewych | 49/375 X |
| 4,400,913 | 8/1983 | Krantz et al. | 49/374 X |

FOREIGN PATENT DOCUMENTS

| | | | |
|---|---|---|---|
| 628560 | 6/1927 | France | 49/348 |
| 1033153 | 6/1966 | United Kingdom | 49/348 |

Primary Examiner—Kenneth Downey
Attorney, Agent, or Firm—Browdy and Neimark

[57] ABSTRACT

An apparatus for reciprocably moving a desired object is disclosed as adapted for use as a vehicle door window regulator. Included is a drive ball assembly comprising a series of balls of a rigid plastic or like material threaded on a wire or like flexible, nonextensible member. One end of the drive ball assembly is anchored to a window panel. An elongate ball guide on a door frame guides the drive ball assembly along a vertical path. At the lower end of the vertical path is a drive wheel rotatably supported on the door frame and having a series of concavities defined peripherally therein for driving engagement with the balls of the drive ball assembly, the latter being preferably turned approximately right angularly around the drive wheel. By imparting bidirectional rotation to the drive wheel, either manually or by a reversible electric motor, the window panel can be moved up and down via the drive ball assembly.

14 Claims, 10 Drawing Figures

APPARATUS FOR RECIPROCABLY MOVING A DESIRED OBJECT SUCH AS A VEHICLE WINDOW PANEL

BACKGROUND OF THE INVENTION

Our invention concerns an apparatus for reciprocably moving a desired object. The apparatus in accordance with our invention finds a typical, and not exclusive, application as a vehicle window regulator, that is, a device for opening and closing a vehicle door window.

While a great variety of vehicle window regulator configurations have been suggested and used, no small percentage of them employ drive tapes of a rigid, but somewhat flexible, plastic for power transmission from a hand crank or a reversible electric motor to the pane or panel of glass or like material closing the window. We will describe one known window regulator with a such drive tape in order to make clear the problems heretofore encountered in the art.

Coiled on a tape reel rotatably mounted to the vehicle door frame, the drive tape slidably extends through a tape guide of channel section secured to the door frame. The tape guide includes a first portion extending diagonally upwardly from the tape reel and a second portion extending vertically downwardly from the upper extremity of the first portion, with the first and second portions being joined via a somewhat gently curved bight portion. The drive tape is fastened to the bottom edge of the window panel at that point of the drive tape which is located at or adjacent the top end of the vertical second portion of the tape guide when the window panel is closed. Thus, by paying off the drive tape from the tape reel, the window panel can be lowered toward an open position as the drive tape travels down the vertical second portion of the tape guide. The rewinding of the drive tape causes the window panel to slide upwardly to a closed position.

As will be readily apparent, the window can be easily closed by this prior art window regulator as the window panel is raised by rewinding the drive tape onto the tape reel. The opening of the window is not easy, however. Unwound from the tape reel, the drive tape by reason of its flexibility does not necessarily effectively transmit the force on the tape reel to the window panel. This has been all the more so because the window panel must travel up the door frame, and the drive tape must move through the tape guide, both in opposition to considerable frictional resistances. We also object to the drive of drive tapes because, being subjected to repeated tension and compression, they are questionable in durability.

We are aware of conventional window regulators that employ wire in substitution for plastic tape. However, wire represents no substantial improvement of plastic tape in respects of durability, performance and friction.

SUMMARY OF THE INVENTION

We have hereby discovered an excellent substitute for the conventional drive tape or wire and have devised a novel apparatus particularly well suited for use as a vehicle window regulator.

According to our invention, stated broadly, there is provided an apparatus for reciprocably moving a desired object with respect to a stationary part, comprising a drive ball assembly having a series of balls threaded on a linear element such as, for example, wire. The drive ball assembly has one end anchored to the object to be moved. A ball guide means is secured to the stationary part for guiding the drive ball assembly along a predetermined path including a linear portion extending in a predetermined direction in which the object is to be reciprocated. Rotatably mounted to the stationary part and disposed on the predetermined path of the drive ball assembly, a drive wheel has a series of concavities defined peripherally therein for driving engagement with the balls of the drive ball assembly. Thus the object can be reciprocably moved with respect to the stationary part as the drive wheel is revolved in both directions to cause the displacement of the drive ball assembly along the predetermined path.

For the use of the above outlined apparatus as a vehicular window regulator, the drive ball assembly may be coupled at one end to the window pane or panel and may be directed downwardly therefrom through an elongate ball guide, secured to the vehicle door frame to define the noted linear portion of the predetermined path of the ball assembly, into positive engagement with the drive wheel rotatably mounted to the door frame. The bidirectional rotation of the drive wheel, either by a hand crank or by a reversible electric motor, causes the drive ball assembly to longitudinally travel back and forth through the ball guide and hence to move the window panel betwen closed and open positions with respect to the door frame.

It will be appreciated that the drive ball assembly in accordance with our invention effectively transmits to the window panel the force that has been exerted on the drive wheel, either manually or by being power driven, regardless of whether the window panel is on its opening or closing stroke. The load on the drive ball assembly is borne both by the balls and by the stringing wire, so that the drive ball assembly as a whole will be highly durable. As an additional advantage, the balls traveling through the ball guide means will encounter much less frictional resistance than the conventional wire or tape.

We recognize that vehicle window regulators must be of minimum possible weight so as not to add significantly to the total weight of the vehicle. Toward this end the balls may be made from a rigid plastic rather than from metal. We have ascertained by experiment that plastic balls perform their intended functions satisfactorily for all practical purposes.

The above and other features and advantages of our invention and the manner of realizing them will become more apparent, and the invention itself will best be understood, from a study of the following description and appended claims, with reference had to the attached drawings showing some preferable embodiments of our invention.

SUMMARY OF THE INVENTION

DESCRIPTION OF THE PREFERRED EMBODIMENTS

General

Figure 1:
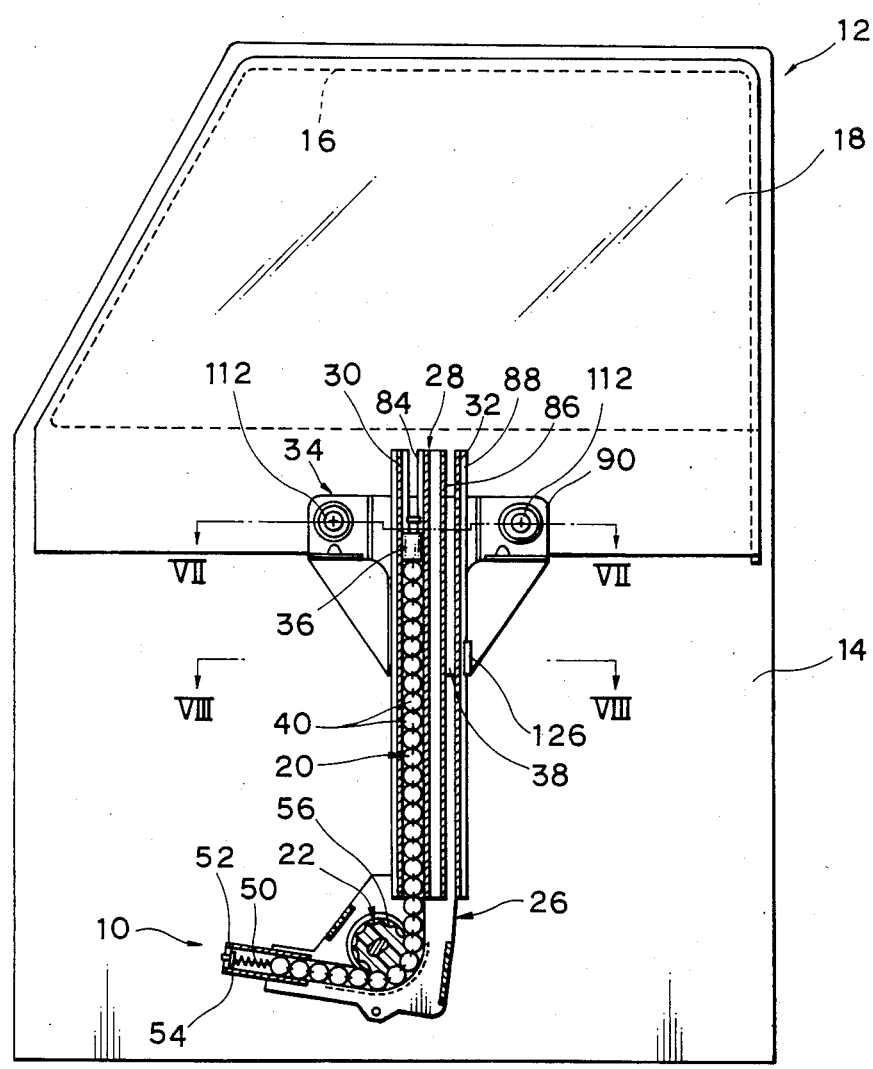
FIG. 1 shows, partly in elevation and partly in vertical section, the apparatus of our invention as mounted interiorly of a vehicle door for use as a window regulator, the window of the vehicle door being herein shown closed.

We will now describe in detail a preferred embodiment of our invention as adapted for use as a vehicle window regulator. Generally designated 10 in FIGS. 1 and 2, the window regulator in accordance with our invention is therein shown mounted to a vehicle door 12 comprising a door frame 14 with an opening 16, and a windowpane or panel 18 of glass or like glazing material mounted to the door frame for up and down sliding motion relative to the same. We have shown the door opening 16 fully closed by the window panel 18 in FIG. 1. Further, although we have not shown the door opening in FIG. 2 for illustrative convenience, it will be seen from the different states of the window regulator 10 in FIGS. 1 and 2 that the window panel 18 is shown in a position to partly open the window in FIG. 2.

Figure 2:
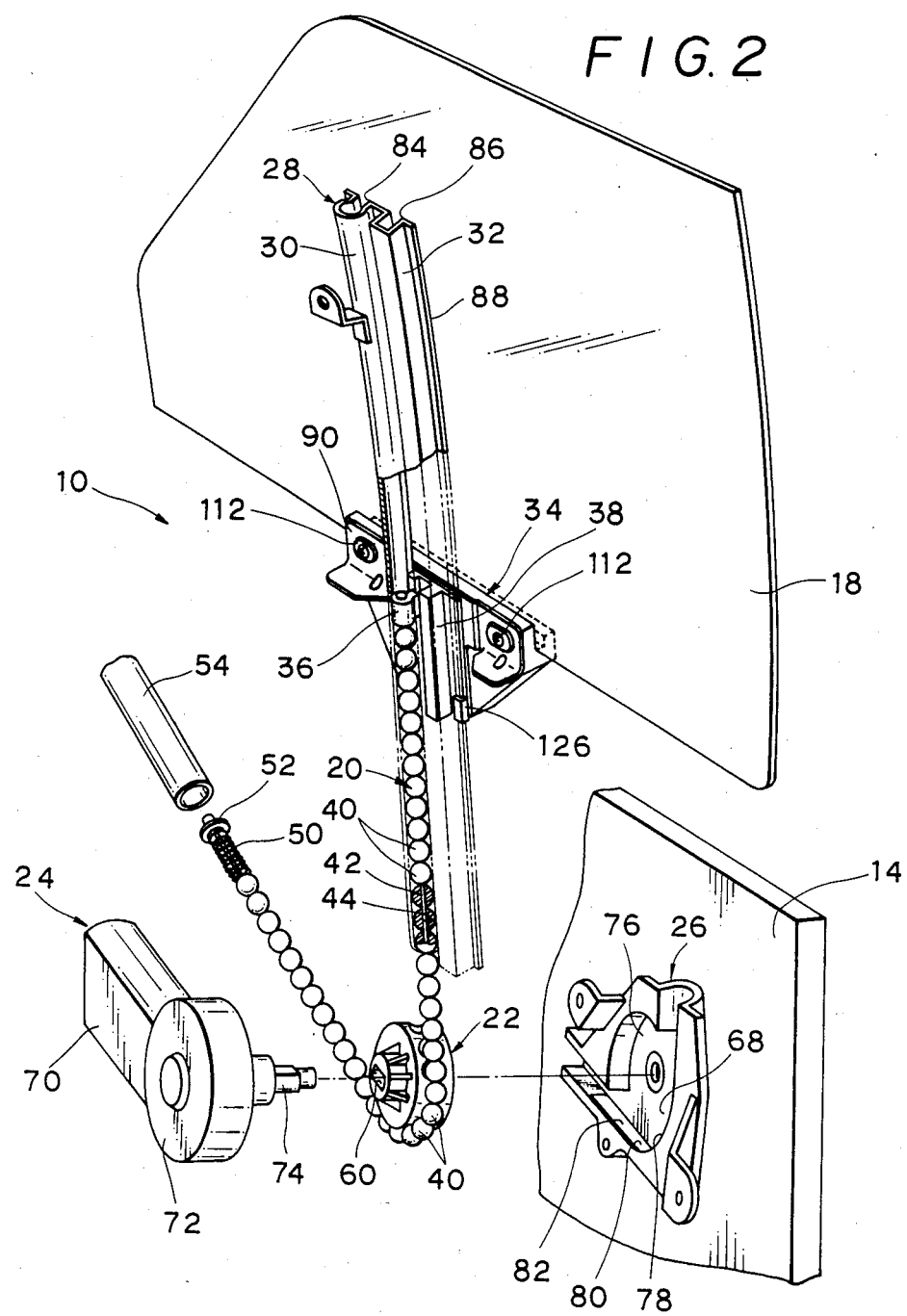
FIG. 2 is an enlarged, exploded perspective view, partly shown broken away to reveal other parts, of the vehicle window regulator of FIG. 1, the window regulator being herein shown in a state when the window is opened.

With reference directed also to FIGS. 1 and 2 the window regulator 10 comprises a drive ball assembly 20 having one end anchored to the window panel 18 at the midpoint of its bottom edge. The drive ball assembly 20 extends along a predetermined path having a first linear portion extending vertically downwardly from the bottom edge of the window panel 18, and a second linear portion joined to the lower extremity of the first linear portion approximately at a right angle thereto to provide a bend therebetween. Disposed at the bend of the predetermined path of the drive ball assembly 20 is a drive wheel 22 rotatably supported on the door frame 14 for driving engagmenet with the drive ball assembly. This drive wheel is to be bidirectionally revolved, either manually or by a reversible electric motor drive unit 24, FIG. 2, to cause the longitudinal displacement of the drive ball assembly 20 and hence to cause the window panel 18 to move between the closed and open positions with respect to the door opening 16.

The drive wheel 22 is rotatably mounted within a drive wheel housing 26 secured to the door frame 14. The primary function of the drive wheel housing 26 is to hold the drive ball assembly 20 in proper driven engagement with the drive wheel 22.

At 28 is shown a guide structure secured to the door frame 14 and integrally comprising a ball guide 30 and a window guide 32 extending parallel to each other. As the names imply, the ball guide 30 serves to guide the drive ball assembly 20 along the noted first linear portion of its predetermined path, and the window guide 32 to guide the window panel 18 between the closed and open positions.

Closely associated wtih the ball and window guide structure 28 is an anchor and slider assembly 34 fastened to the window panel 18. The anchor and slider assembly 34 comprises an anchor 36 and a slider 38. The anchor 36 has the upper extremity of the drive ball assembly 20 fastened thereto and is itself slidably engaged in the ball guide 30 of the ball and window guide structure 28. The slider 38 is slidably engaged in the window guide 32 of the ball and window guide structure 28.

We will hereinafter discuss in more detail the above mentioned drive ball assembly 20, drive wheel 22, reversible electric motor drive unit 24, drive wheel housing 26, ball and window guide structure 28, and anchor and slider assembly 34, in that order, under the respective headings. The operational description of the complete window regulator 10 will follow the detailed discussion of the listed components.

Drive Ball Assembly

Figure 3:
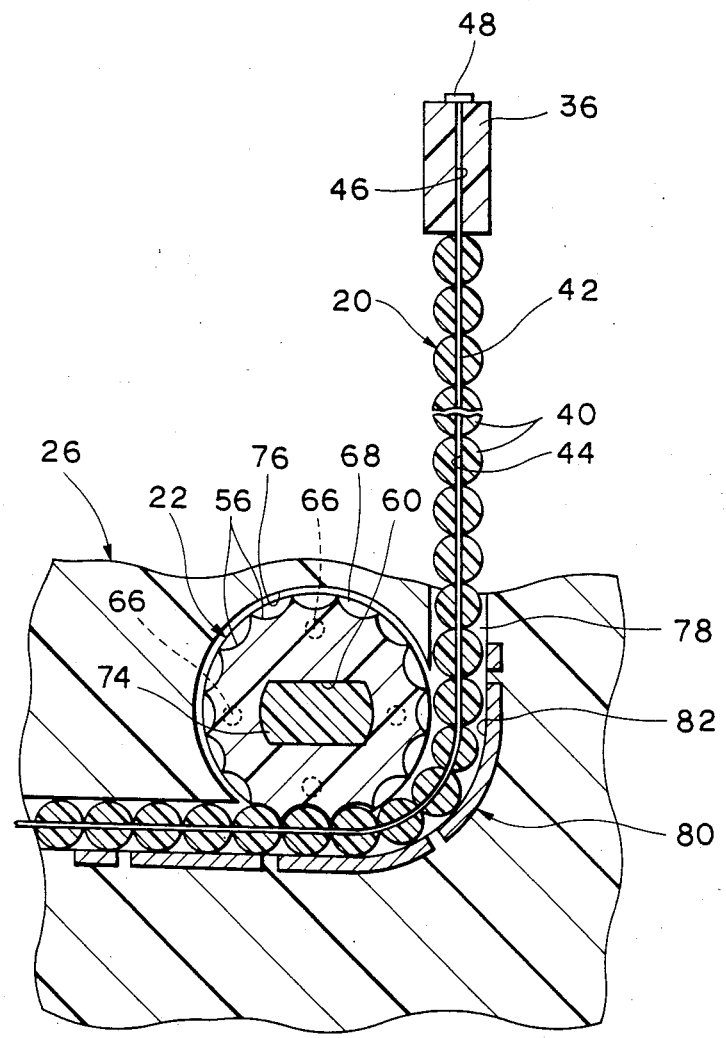
FIG. 3 is a still more enlarged, vertical fragmentary section through the window regulator, showing in par

Reference is directed to FIGS. 1 through 3 for a study of th drive ball assembly 20. It has a plurality or multiplicity of balls 40 threaded together on a flexible linear element 42. The balls 40 should be rigid and sufficiently wearproof to assure years of troublefree operation for the window regulator 10. Although metal is of course a possible material of the balls 40, we recommend the use of rigid plastic for the desired lighter weight of the complete apparatus. The linear element 42, on the other hand, must be practically nonextensible, besides being flexible, and strong enough to resist breakage under all expected conditions of use. Steel wire is a preferred example of the linear element 42. Each ball 40 has formed therein a hole 44 extending through its center for the passage of the linear element 42 therethrough.

As clearly indicated in FIG. 3, one end portion of the linear element 42 extends upwardly through an axial bore 46 in the anchor 36 of the anchor and slider assembly 36. A suitable rigid enlargement 48 is formed on the extremity of the linear element 42 protruding from the anchore bore 46, so that the linear element is nonwithdrawable therefrom. Since the anchor and slider assembly 36 is secured to the window panel 18 as aforesaid, the drive ball assembly 20 can be thought of as being anchored at one end to the window panel.

FIGS. 1 and 2 show, on the other hand, that the other end portion of the linear element 42 of the drive ball assembly 20 extends through a helical compresion spring 50 and has its extremity coupled to another anchor 52. The compression spring 50, perhaps together with some neighboring balls 40, is loosely received in a guide tube 54 which is rigidly coupled to the drive wheel housing 26 to define the noted second linear portion of the predetermined path of the drive ball assembly 20. The second anchor 52 is immovably engaged in. the distal end, away from the drive wheel housing 26, of the guide tube 54. It will therefore be understood that the compression spring 50 acts between this second anchor 52 and the extreme one of the balls 40 to bias these balls in a direction to urge the window panel 18 toward the closed position of FIG. 1 with respect to the door frame 14.

Drive Wheel

Figure 4:
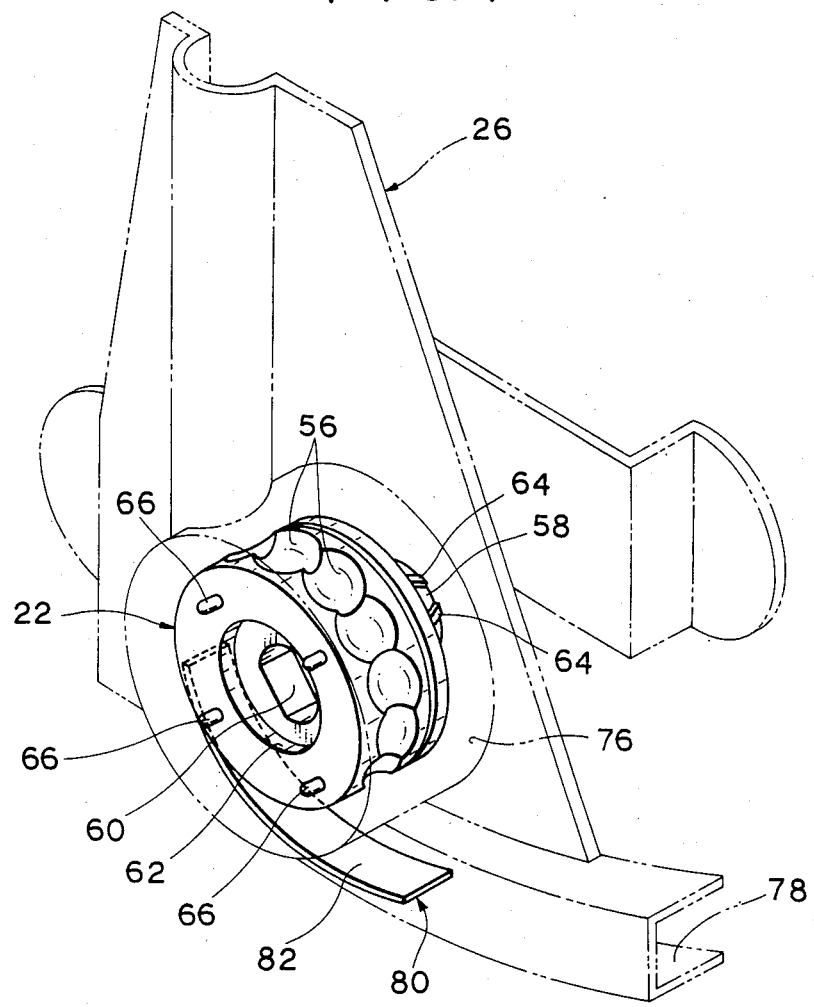
- FIG. 4 is an enlarged perspective view of the drive wheel of the window regulator, shown together with a phantom representation of a housing for the drive wheel.
Figure 5:
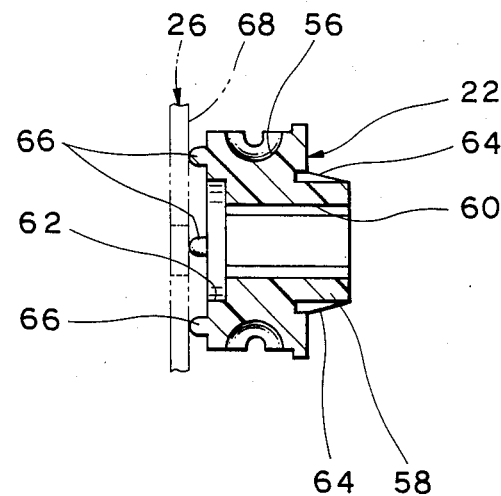
FIG. 5 is an axial section, drawn on a reduced scale in comparison with FIG. 4, of the drive wheel.

The configuration of the drive wheel 22 will be best understood from a study of FIGS. 3, 4 and 5. Rotatably supported by the drive wheel housing 26 on the door frame 14, the drive wheel 22 has a series of concavities 56 defined peripherally therein in overlapping relation to one another. As best pictured in FIG. 3, the balls 40 of the drive ball assembly 20 are to become engaged in these concavities 56 as they travel past the drive wheel 22. Accordingly, by revolving the drive wheel 22 in either direction, the drive ball assembly 20 can be forced to travel longitudinally in the corresponding direction. We recommend that the drive wheel 22 be also molded of a rigid plastic for the reduction of the total weight of the window regulator 10.

A boss 58 concentrically protrudes rightwardly, as viewed in FIG. 4, or toward the interior of the vehicle, from one side of the drive wheel 22. A bore 60 extends axially through the drive wheel 22 inclusive of the boss 58. This bore should be of noncircular cross section, preferably defined in part by a pair of parallel surfaces as best seen in FIG. 3, for driven engagement with the motor drive unit 24, FIG. 2, to be detailed subsequently. The bore 60 has a circular enlargement 62 at its end away from the boss 58, in order that the radial dimension of the drive wheel 22 may not vary too much in its axial direction and so may maintain the dimensional accuracy throughout the expected lifetime of the window regulator 10.

The boss 58 has a plurality of reinforcing ribs 64 formed at constant circumferential spacings thereon. Extending axially of the boss 58, the reinforcing ribs 64 are joined each at one end to the main body of the drive wheel 22. These ribs are effective to enhance the strength of the drive wheel 22, particularly of its portion immediately around the bore 60, which is especially susceptible to heavy load in use, in the face of the bore enlargement 62.

A plurality of, four in this particular embodiment, small protuberances 66 are formed on that side of the drive wheel 22 opposite to the side where the boss 58 is formed. Disposed at constant angular spacings about the axis of the drive wheel 22, these small protuberances 66 slidably butt on the opposed wall 68, FIG. 5, of the drive wheel housing 26, making it possible for the drive wheel to rotate relative to the drive wheel housing with a minimum of frictional resistance.

Motor Drive Unit

As shown in FIG. 2, the motor drive unit 24 is a unitized combination of a reversible electric motor 70 and a speed reducer 72. The output shaft 74 of the motor drive unit 24 has a noncircular cross sectional shape corresponding to that of the bore 60 in the drive wheel 22. FIG. 3 shows that the motor drive unit output shaft 74 is snugly engaged in the drive wheel bore 60 for imparting bidirectional rotation to the drive wheel 22. The bidirectional rotation of the drive wheel 22 results in the longitudinal displacement of the drive ball assembly 20 in both directions along the predetermined guided path and hence in the up and down motion of the window panel 18 with respect to the door frame 14. We understand that this motor drive unit 24 is mounted fast to the door frame 14.

Notwithstanding the showings of FIGS. 2 and 3, however, we do not wish the window regulator 10 of our invention to be limited to the power driven construction. Instead, as will be readily understood, the drive wheel 22 may be hand operated, as by coupling a hand crank, not shown, thereto. Thus the window regulator 10 is open to both motor driven and manual designs. Either design may be chosen to suit each particular application of our invention.

Drive Wheel Housing

Although the drive wheel housing 26 appears in all of FIGS. 1 through 4, its construction will be better understood from an inspection of FIGS. 2 and 4. Mounted fast to the door frame 14, the drive wheel housing 26 is disposed at the bend of the predetermined path of the drive ball assembly 20. The drive wheel housing 26 defines a circular drive wheel chamber 76 for rotatably accommodating the drive wheel 22, and contiguous to the drive wheel chamber, a substantially L shaped drive ball passage way 78 at the joint between the first and second linear portions of the predetermined path of the drive ball assembly 20. The drive wheel chamber 76 and drive ball passageway 78 are both open toward the vehicle interior and are exteriorly closed by the wall 68 set forth in connection with FIG. 5.

With the drive wheel 22 rotatably mounted in the drive wheel chamber 76, and with the drive ball assembly 20 threaded through the drive ball passageway 78, both as best depicted in FIG. 3, some of the drive balls 40 are positively engaged in the concavities 56 in the drive wheel 22. The drive wheel 22 thus makes proper drive engagement with the drive ball assembly 20.

A preferred material of the drive wheel housing 26 is also a rigid plastic. However, if the drive wheel housing 26 were made solely of a plastic, its surface defining the drive ball passageway 78 might suffer rapid wear from sliding friction with the drive balls 40. We therefore recommend that at least part of the drive wheel housing surface defining the drive ball passageway 78 be lined with an antifriction metal insert or inserts 80 for direct contact with the drive balls 40. Preferably, the metal insert or inserts may be embedded in the drive wheel housing 26, as by the known insert molding technique, with its or their exposed surfaces 82 flush with the drive wheel housing surface defining the drive ball passageway 78.

Ball And Window Guide Structure

We will refer to FIGS. 1, 2, 7 and 8 for the detailed description of the ball and window guide structure 28. Preferably made of sheet metal, the ball and window guide structure 28 is an integral combination of the ball guide 30 and the window guide 32 extending parallel to each other. The structure 28 is rigidly mounted to the door frame 14.

The ball guide 30 is substantially tubular in shape. We said "substantially" because the ball guide 30 has a slot 84 extending longitudinally therethrough to allow the anchor 36 on the window panel 18 to slide longitudinally therein, as will be best understood from FIG. 7. The ball guide 30 also slidably receives part of the drive ball assembly 20. Having its bottom end coupled to the drive wheel housing 26, the ball guide 30 guides the drive ball assembly 20 along the first linear portion of its predetermined path. We have already stated that the drive ball assembly 20 is guided along the second linear portion of its predetermined path by the guide tube 54 seen in FIGS. 1 and 2. Thus the drive ball assembly 20 travels through the ball guide 30, the L shaped passageway 78 defined by the drive wheel housing 26, and the guide tube 54.

Extending parallel to the ball guide 30, the window guide 32 is channel shaped, having a slot like opening 86 directed toward the anchor and slider assembly 34 or toward the vehicle exterior. The window guide 32 slidably receives the slider 38 of the anchor and slider assembly 34 on the window panel 18, thereby guiding the travel of the window panel between the closed and open positions with respect to the door frame 14. A flange 88 is formed on one side of the window guide 32 and extends throughout its length. We will later refer to this flange 88 in conjunction with the anchor and slider assembly 34.

Anchor And Slider Assembly

Figure 8:
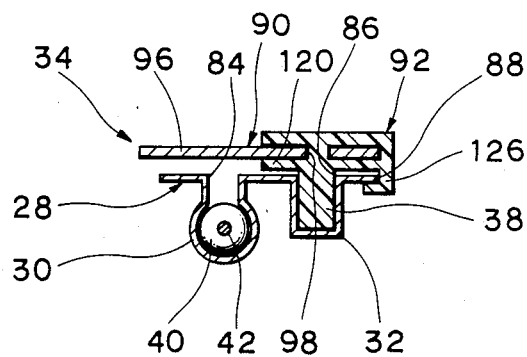
FIG. 8 is also an enlarged, horizontal section through the window regulator of FIG. 1, taken along the line VIII—VIII therein and also showing in particular the anchor and slider assembly together with the integral combination of ball guide and window guide.
Figure 6:
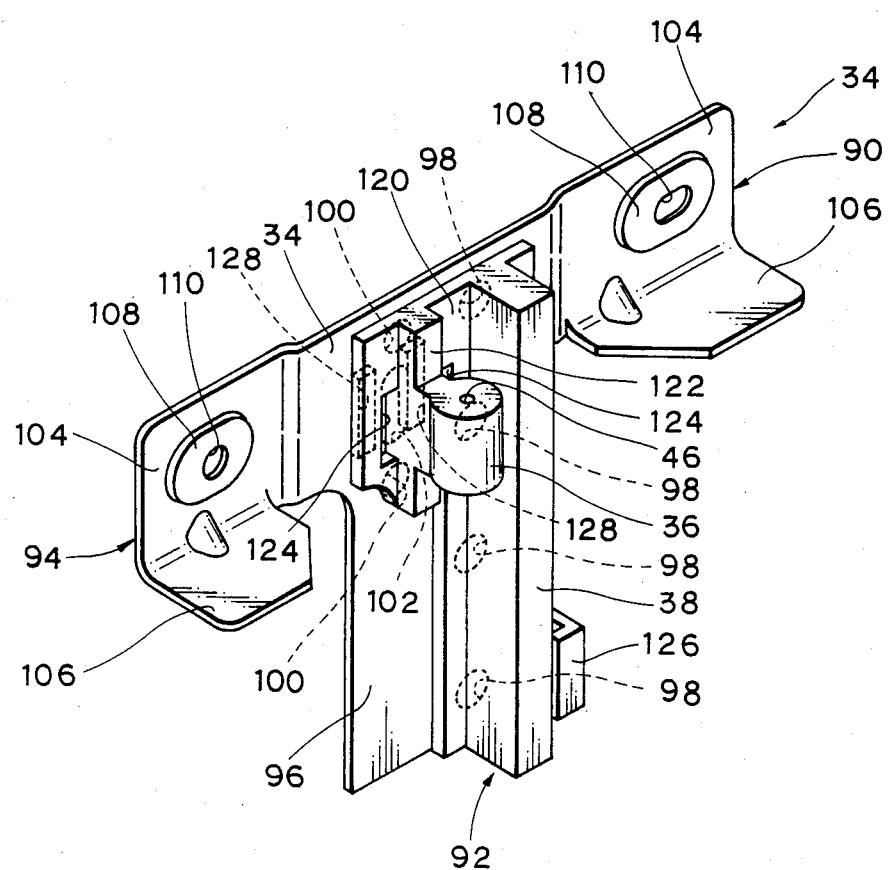
FIG. 6 is a perspective view of an anchor and slider assembly included in the window regulator of FIG. 1.
Figure 7:
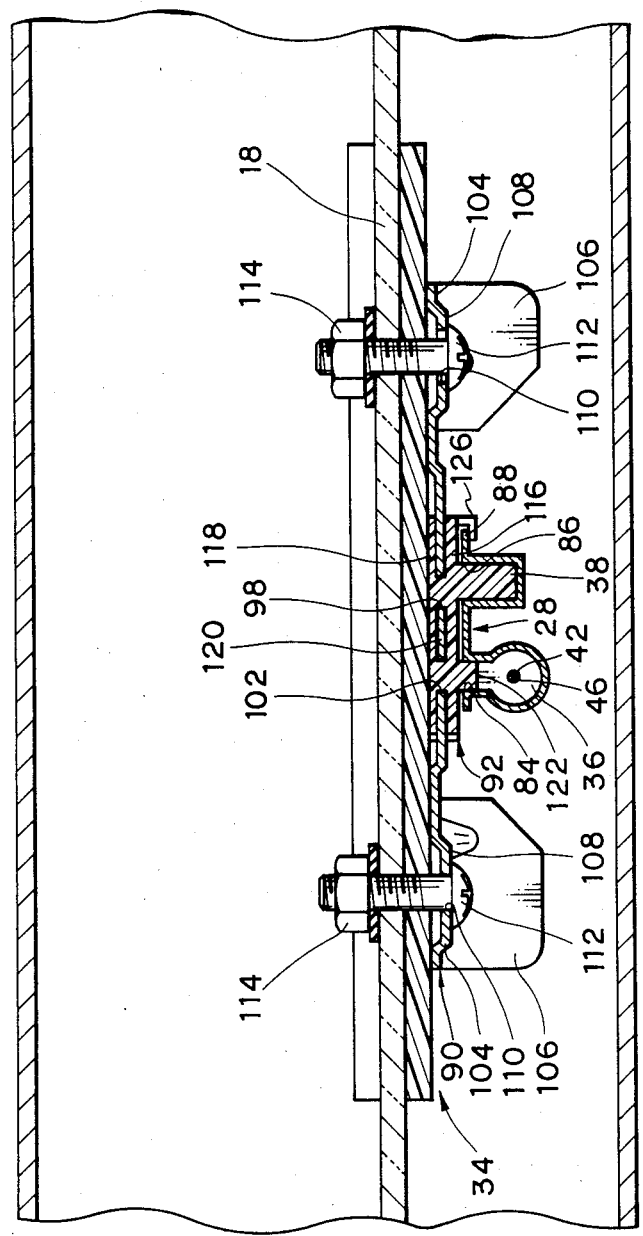
FIG. 7 is an enlarged, horizontal section through the window regulator of FIG. 1, taken along the line VII—VII therein and showing in particular the anchor and slider assembly together with an integral combination of ball guide and window guide.

Reference is directed principally to FIGS. 6 and 7 for an extensive discussion of the anchor and slider assembly 34, although it appears also in FIGS. 1, 2 and 8. The anchor and slider assembly 34 has two primary components, a metal made mount 90 and an anchor and slider structure 92 molded of a rigid plastic. The anchor and slider structure 92, comprising the anchor 36 and slider 38, may be "outsert" molded with the mount 90; that is, the structure 92 may be molded in place on the mount 90. This mount serves to rigidly attach the anchor and slider structure 92 to the window panel 18. We will first describe the mount 90 in detail.

The mount 90 is approximately T shaped as seen in a front view as in FIG. 1 or 6, having a horizontal limb 94 and a vertical limb 96, both as indicated in FIG. 6. The vertical limb 96, on which the anchor and slider structure 92 is mostly formed, has defined therein a plurality of, four in the illustrated embodiment, holes 98 arranged in a vertical row in register with the slider 38, another group of two vertically spaced holes 100 and a slot 102 therebetween, which are disposed in register with the anchor 36. These holes 98 and 100 and slot 102 are all intended to allow the anchor and slider structure 92 to be molded in place thereon so as to be formed in one piece on both interior and exterior sides of the mount 90, as will be best understood from FIG. 7 and as will be later explained in more detail.

The horizontal limb 94 of the mount 90 may be thought of as comprising a pair of wings 104 extending in opposite directions from the top of the vertical limb 96. As best shown in FIG. 7, these wings are offset toward the vehicle exterior with respect to the vertical limb 96 to an extent approximately equal to the thickness of the sheet metal of which the mount 90 is made. Each wing 104 has a bend 106 directed toward the vehicle interior from its bottom end, a boss 108 protruding toward the vehicle interior. A hole 110 is defined centrally in the boss 108 of each wing 104. The mount 90 is fastened to the bottom edge of the window panel 18 by a pair of bolts 112, complete with nuts 114, passing through the respective holes 110 in the bosses 108 of the wings 104. As the mount 90 is thus fastened to the window panel 18, so is the complete anchor and slider assembly 34.

We will now proceed to the description of the anchor and slider structure 92 molded in place on the mount 90. As indicated in FIG. 7 the anchor and slider structure 92 has an interior portion 116 formed on the interior side of the mount 90, and an exterior portion 118 formed on the exterior side of the mount. The exterior 116 and exterior 118 portions are of course integrally joined to each other by the bridge portions passing the noted holes 98 and 100 and slot 102 in the mount 90.

Perhaps as better shown in FIG. 6, the interior portion 116 of the anchor and slider structure 92 comprises the anchor 36, the slider 38, an inverted L shaped base 120 for both the anchor and the slider, and a raised strip 122 on the base having the anchor 36 formed thereon. The anchor 36 is cylindrical in shape, with its axis oriented vertically, and is sized to slidably fit in the ball guide 30. The slider 38 is elongated vertically to a considerably greater extent than the anchor 36 and has a thickness and width to slidably fit in the window guide 32. The inverted L shaped base 120 may have a thickness slightly greater than that of the sheet metal of which the mount 90 is made. This base has a pair of slots 124, FIG. 6, disposed on both sides of the raised strip 122.

Further, as indicated in FIGS. 6 through 8, the base 120 of the interior portion 116 of the anchor and slider structure 92 is formed to include an L shaped lug 126 generally protruding toward the vehicle interior from its bottom end. Disposed on that side of the slider 38 opposite to the side where the anchor 36 lies, the lug 126 slidably engages the longitudinal flange 88 of the window guide 32. It is thus seen that the anchor and slider structure 92 triply engages the ball and window guide structure 28, with the anchor 36 making a sliding fit in the ball guide 30, with the slider 38 also making a sliding fit in the window guide 32, and with the lug 126 slidably engaging the window guide flange 88. The lug 126 is effective to prevent the oscillatory movement of the anchor and slider assembly 34, and hence of the window panel, during its up and down motion along the ball and window guide structure 28.

Although the exterior portion 118 of the anchor and slider structure 92 is seen only incompletely in FIGS. 6 and 7, we understand that the exterior portion 118 is of approximately the same shape and size as the inverted L shaped base 120 of the interior portion 116. Further the exterior portion 118 can be disposed approximately in register with the interior portion base 120. The thickness of the exterior portion 118 may also be just about the same as that of the sheet metal of which the mount 90 is made. As shown in FIG. 6, a pair of slots 128 are formed in the exterior portion 118 so as to be in register with the aforesaid pair of slots 124 in the interior portion base 120.

Operation

Although we believe that the operation of the window regulator 10 is apparent from the foregoing description of its components, we will make further amplification in the following brief description of such operation.

The drive wheel 22 may be driven, either by the reversible motor drive unit 24 or by the unshown hand crank, in a clockwise direction, as viewed in FIGS. 1 and 2, to lower the window panel 18 and so to open the vehicle door window, and in a counterclockwise direction to raise the window panel and so to close the window. The drive wheel 122 is in positive engagement with some of the balls 40 of the drive ball assembly 20 in the L shaped ball passageway 78 within the drive wheel housing 26. Therefore, upon rotation of the drive wheel 22, the drive ball assembly 20 travels up or down the upstanding ball guide 30 depending upon the direction of the drive wheel rotation. Since the drive ball assembly 20 is anchored to the window panel 18 via the anchor and slider assembly 34, the window panel moves up or down with the drive ball assembly relative to the door frame 14. Such up and down motion of the window panel 18 is guided by the window guide 32, complete with the side flange 88, in sliding engagement with the slider 38 and lug 126 of the anchor and slider assembly 34.

When the drive wheel 22 is revolved in either direction as above to cause the displacement of the drive ball assembly 20, part of the driving force is exerted via the balls 40 on that surface of the drive wheel housing 26 which is opposed to concaved periphery of the drive wheel. We have embedded the antifriction metal insert or inserts 80 in this surface of the drive wheel housing 26 for the minimization of the friction against the sliding motion of the balls 40. The load on the motor drive unit 24 is thus significantly reduced, or, in the case of manual drive, a significantly less turning force is required. The useful life of the window regulator 10 will also be extended considerably.

Alternative Form

Figure 9:
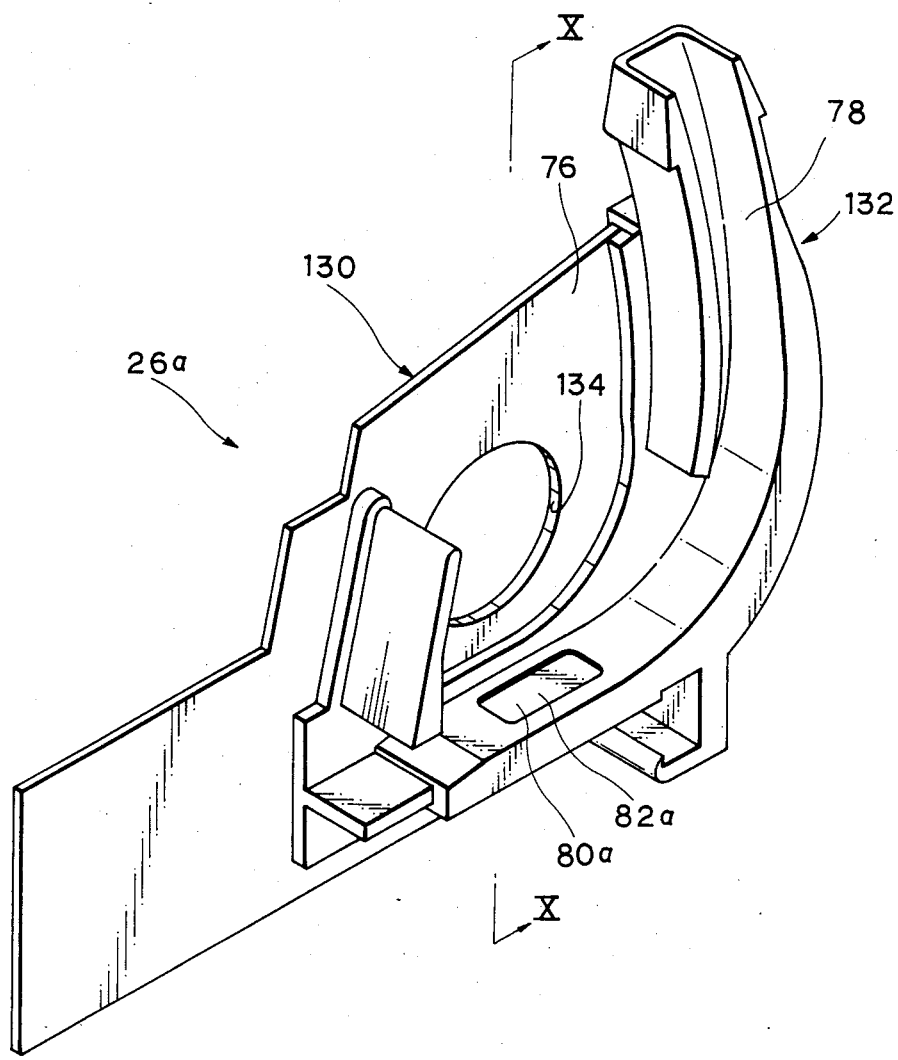
FIG. 9 is a perspective view of an alternative form of the drive wheel housing.
Figure 10:
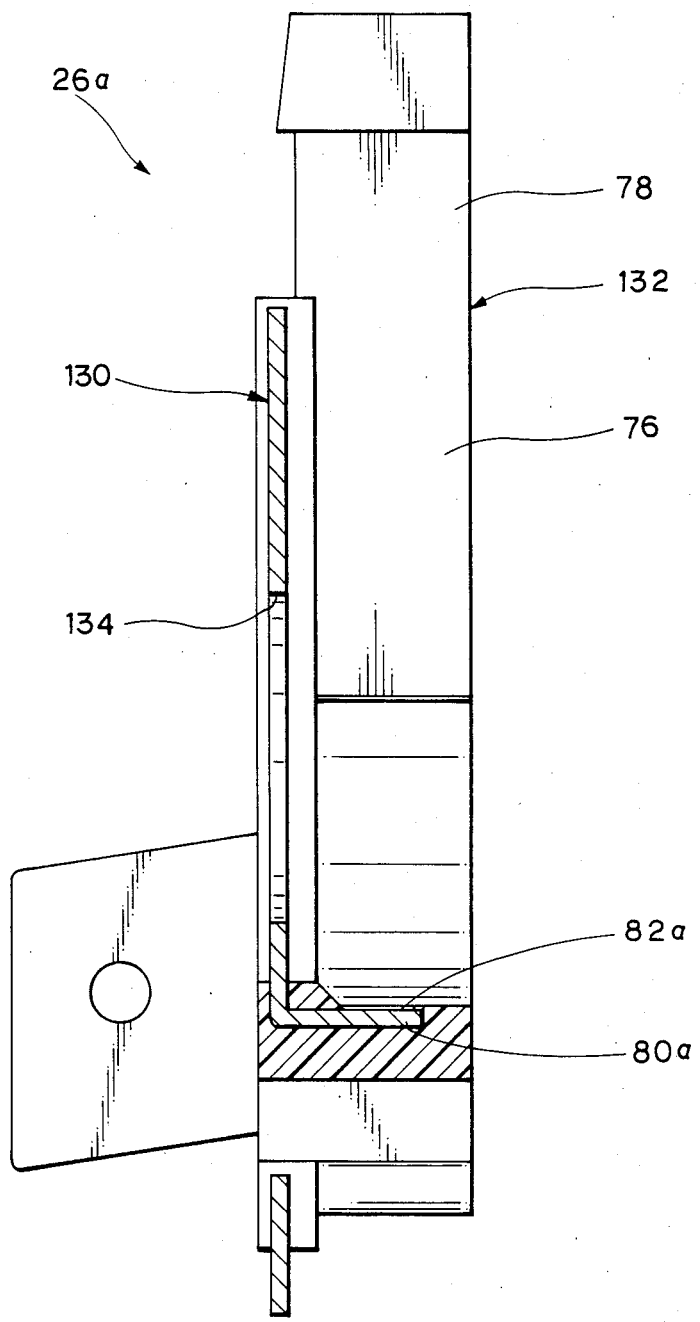
FIG. 10 is a vertical section through the alternative drive wheel housing of FIG. 9, taken along the line X—X therein.

We have illustrated in FIGS. 9 and 10 an alternative form 26a of the drive wheel housing 26. The alternative drive wheel housing 26a comprises a generally flat metal frame 130 and a rigid plastic part 132 which has been molded in place on the metal wall. The plastic part 132 is shaped to define the L shaped ball passageway 78 and, in combination with the metal frame 130, the drive wheel chamber 76. The metal frame 130 has a flange 80a bent right angularly therefrom and buried in the plastic part 132. The flange 80a is partly exposed through that surface of the plastic part 132 which defines the ball passageway 78, to provide an antifriction surface 82a for direct contact with the drive balls being engaged by the drive wheel. The metal frame 103 has a circular aperture 134 therein in concentric relation with the drive wheel in the drive wheel chamber 76. Although we have not shown the drive wheel in FIGS. 9 and 10, we understand that the drive wheel for use with this housing 26 has an additional boss formed concentrically on its side where the small protuberances 66, FIG. 4, are formed in the drive wheel 22 of the preceding embodiment. This additional boss is to be rotatably engaged in the aperture 134 in the metal frame 130.

Although we have shown and described our invention in highly specific aspects thereof, we understand that our invention is not to be limited by the exact details of the foregoing disclosure. A variety of modifications, alterations and adaptations of our invention will readily occur to the specialists within the broad teaching hereof.

We claim:

1. A vehicle door window regulator for moving a window panel up and down with respect to a door frame, said window regulator comprising:
    a drive ball assembly including a series of balls of rigid plastic and a flexible wire on which said balls are threaded together, said drive ball assembly having one end anchored to said window panel;
    ball guide means for guiding the drive ball assembly along a predetermined path including a first portion extending downwardly from the window panel and a second portion joined to said first portion at an angle thereto, said ball guide means including an elongated ball guide secured to the door frame and extending along said first portion of the predetermined path of the drive ball assembly;
    a drive wheel rotatably supported on the door frame and disposed at the joint between said first and second portions of the predetermined path of the drive ball assembly, the drive wheel having a series of concavities defined peripherally therein for driving engagement with the balls of the drive ball assembly;
    biasing means for biasing said drive ball assembly in a direction to urge said window panel toward a closed position with respect to the door frame; and
    window guide means for guiding the window panel up and down with respect to the door frame, said window guide means including an elongated window guide extending parallel to said elongate ball guide of the ball guide means and formed integral therewith, and a slider secured to the window panel and slidably engaged with said elongate window guide.

2. A vehicle door window regulator as set forth in claim 1, wherein the balls of the drive ball assembly are made of a rigid plastic, and the linear element of the drive ball assembly is wire.

3. A vehicle door window regulator as set forth in claim 1, further comprising a compression spring through which the drive ball assembly has another end thereof coupled to a stationary part the compression spring acting on the drive ball assembly to force the window panel toward a closed position with respect to the door frame.

4. A vehicle door window regulator as set forth in claim 1, wherein the ball guide means comprises an elongate ball guide secured to the door frame and extending along the first portion of the predetermined path of the drive ball assembly, the ball guide slidably receiving part of the drive ball assembly.

5. A vehicle door window regulator as set forth in claim 4, further comprising window guide means for guiding the window panel up and down with respect to the door frame, the window guide means comprising:
    (a) an elongate window guide extending parallel to the ball guide of the ball guide means and formed integral therewith; and
    (c) a slider secured to the window panel and slidably engaged in the window guide.

6. A vehicle door window regulator as set forth in claim 5, further comprising an anchor and slider assembly comprising:
    (a) an anchor to which said one of the drive ball assembly is coupled and which is slidably engaged in the ball guide, the anchor being formed integral with the slider; and
    (b) a mount for rigidly mounting the anchor and slider to the window panel.

7. A vehicle door window regulator as set forth in claim 6, wherein the mount of the anchor and slider assembly is made of a metal, and wherein the anchor and slider of the anchor and slider assembly are a cone piece molding of a rigid plastic.

8. A vehicle door window regulator as set forth in claim 7, wherein the anchor and slider of the anchor and slider assembly is molded in place on the mount.

9. A vehicle door window regulator as set forth in claim 6, wherein the mount of the anchor and slider assembly is adapted to slidably engage the window guide.

10. A vehicle door window regulator as set forth in claim 1, further comprising a drive wheel housing secured to the door frame and adapted to hold the balls of the drive ball assembly in proper driven engagement with the drive wheel.

11. A vehicle door window regulator as set forth in claim 10, wherein the drive wheel housing is adapted to define a drive wheel chamber rotatably accommodating the drive wheel, and a substantially L shaped ball passageway at the joint between the first and second portions of the predetermined path of the drive ball assembly.

12. A vehicle door window regulator as set forth in claim 11, wherein the drive wheel housing is molded of a rigid plastic and has an antifriction metal insert defining at least part of the L shaped ball passageway.

13. A vehicle door windowr regulator as set forth in claim 11, wherein the drive wheel housing comprises:
 (a) a generally flat metal frame; and
 (b) a rigid plastic part molded in place on the metal frame and adapted to define the L shaped ball passageway and, in combination with the metal frame, the drive wheel chamber;
 (c) the metal frame having a flange at least partly open to the L shaped ball passageway to provide an antifriction surface.

14. A vehicle door window regulator as set forth in claim 1, further comprising a reversible electric drive motor coupled to the drive wheel.

* * * * *